(12) United States Patent
Kotliar

(10) Patent No.: US 6,314,754 B1
(45) Date of Patent: Nov. 13, 2001

(54) HYPOXIC FIRE PREVENTION AND FIRE SUPPRESSION SYSTEMS FOR COMPUTER ROOMS AND OTHER HUMAN OCCUPIED FACILITIES

(76) Inventor: Igor K. Kotliar, 50 Lexington Ave., Suite 249, New York, NY (US) 10010

( * ) Notice: Subject to any disclaimer, the term of this patent is extended or adjusted under 35 U.S.C. 154(b) by 0 days.

(21) Appl. No.: 09/551,026

(22) Filed: Apr. 17, 2000

(51) Int. Cl.[7] ........................................................ F25J 1/00
(52) U.S. Cl. .................................. 62/640; 62/28; 169/45
(58) Field of Search ........................... 95/47, 54; 62/78, 62/640; 169/45

(56) References Cited

U.S. PATENT DOCUMENTS

| 4,896,514 | * | 1/1990 | Sugiyama et al. | 62/78 |
| 5,063,753 | * | 11/1991 | Woodruff | 62/78 |
| 5,388,413 | * | 2/1995 | Major et al. | 62/911 |
| 5,472,480 | * | 12/1995 | Barbe | 95/54 |
| 5,649,995 | * | 7/1997 | Gast, Jr. | 95/54 |
| 5,799,495 | * | 9/1998 | Gast, Jr. | 62/78 |
| 5,921,091 | * | 7/1999 | Foss et al. | 62/46.1 |

* cited by examiner

Primary Examiner—Ronald Capossela

(57) ABSTRACT

Fire prevention and suppression system is provided for human occupied computer rooms and other industrial and public facilities. The equipment of the system provides low-oxygen environments with climate control and at normal atmospheric or slightly increased pressure. The system employs an oxygen-extraction apparatus, which supplies oxygen-depleted air inside an enclosed area communicating with the device. A fire-extinguishing composition is provided for continuous use in human occupied environments, being mostly a mixture of nitrogen and oxygen having oxygen content ranging from 12% to 18%.

18 Claims, 2 Drawing Sheets

Altitude or hypobaric environment

Normbaric hypoxic environment

Normbaric normoxic environment

● – oxygen molecules    O – nitrogen molecules

HYPOXIC FIRE PREVENTION AND FIRE SUPPRESSION SYSTEMS FOR COMPUTER ROOMS AND OTHER HUMAN OCCUPIED FACILITIES

RELATED APPLICATIONS

This invention is related to preceding U.S. Pat. No. 5,799,652 issued Sep. 1, 1998, U.S. Pat. No. 5,887,439 issued Mar. 30, 1999 and U.S. Pat. No. 5,924,419 of Jul. 20, 1999.

FIELD OF THE INVENTION

The present invention relates to a process and equipment for providing low-oxygen (hypoxic) environments in computer rooms and other human occupied facilities in order to prevent and suppress fire before it starts.

The demand in reliable fire prevention and suppression systems for industrial applications has been growing extensively in last years, especially with the explosive development of Internet, computerized equipment and communication systems. The invented Fire Prevention And Suppression System (later called FirePASS) can be used in any possible application where a human occupied environment requires protection from fire hazard or explosion.

DESCRIPTION OF THE PRIOR ART

At the present time there are no products on the market that would allow to prevent fire from igniting in computer rooms or other human-occupied facilities. Multiple computers and servers stocked in one room produce a lot of heat mainly due to friction and overheating of electronic components. At any time a malfunction of an electronic component or short circuit may cause fire and extensive damage. The only measures that being taken in the direction of may cause fire and extensive damage. The only measures that being taken in the direction of fire prevention is extensive cooling of the computer room environment, which doesn't help when a fire starts. It means, that there is no technology to provide a reliable fire preventive environment in a computer room or whole building filled with computerized equipment or combustible materials.

Current fire suppression systems are destructive for computerized equipment and hazardous for human operators. Even in a case of a small fire such systems start spraying water or foam that completely destroy computers or produce gases or chemicals that may suppress fire for a limited time but may be toxic and environmentally destructive.

There are many thousands such computer rooms in the U.S. only, owned by large corporations, banks, communication companies, military and government agencies, many of them loosing millions of dollars in just one such fire. And none of these facilities would be guaranteed from such destruction, until the invented Hypoxic FirePASS will be implemented.

Most usable fire fighting systems employ water, dry or liquid chemicals and gaseous agents, such as Halon 1301, carbon dioxide or heptafluoropropane, and mixtures of different gases, most of them are ozone depleting, toxic and environmentally unfriendly.

However, the real problem is that all known fire protection systems can be deployed only when fire already starts and can last for a limited time. Even the latest Fire Master 200 (FM 200) fire suppression system allows only to slowing down a fire by chemically preventing combustion for several minutes. After all gas is released a sprinkler system starts spraying water destroying all computer equipment or other goods permanently.

None of current fire fighting systems in human occupied facilities can prevent fire from starting. The process and equipment described in this invention can guarantee that no fire will be able to start in normbaric hypoxic environments with oxygen content of 15% or lower.

The invention described in this document will revolutionize the whole fire fighting industry worldwide and will make obsolete all current environmentally hazardous chemical systems.

This invention will prevent huge financial and environmental losses from industrial fires and will save many lives of fire fighters and general public.

SUMMARY OF THE INVENTION

A principal object of this invention is to provide a method for producing a fire safe hypoxic environment inside a room or facility containing computerized equipment or any combustible, inflammable or explosive materials.

Further object of the present invention is the provision of an oxygen-depletion process and equipment for producing a low-oxygen environment inside a computer room or whole facility building, such equipment employing molecular-sieve adsorption or membrane-separation technologies.

Another object of the present invention is to provide an apparatus for producing a fire-retarding environment inside a computer room or facility, accessible and safe for human operators without special respiratory support equipment.

A still further object of the invention is to provide a fire-retarding oxygen-depleted environment inside a computer room or industrial facility at standard or slightly increased atmospheric pressure and having oxygen content ranging from 12% to 18%.

Still another object of the present invention is the provision of a hypoxic fire-retarding environment with controllable temperature and humidity.

A still further object of the invention is to provide an easily accessible human occupied hypoxic environment that provides efficient protection from fire ignition, but does not need to be sealed from the surrounding environment.

A still another object of the invention is to provide normbaric hypoxic environments for people to work in safely without respiratory-support means, such environments having oxygen content in a range from 15.5 to 14.5%, which corresponds to the partial pressure of oxygen in the air at altitudes from 8,000 to 10,000 feet.

Another object of the invention is a provision of fire-extinguishing composition for continues use in human occupied environments.

DESCRIPTION OF THE INVENTION

This invention is based on a discovery made by the inventor during research with the Hypoxic Room System made by Hypoxico Inc. in New York. It was discovered that a normbaric hypoxic environment provides a different effect on ignition and combustion process than hypobaric or natural altitude environments with the same partial pressure of oxygen. For example, there will be no problem for a candle to burn or a paper to ignite on an altitude of 9,000' (2700 m) in the air having partial pressure of oxygen at 4.51" (114.5 mm) of mercury.

However, if we create a corresponding normbaric hypoxic environment with the same partial pressure of oxygen at 4.51" or 114.5 mm of mercury, we will find that the candle will not burn and paper will not ignite. Even a match will extinguish instantly after ignition of oxygen-carrying chemicals on the tip of it. A burning match or paper brought from outside into such normbaric hypoxic environment would extinguish by itself instantly. Even a propane gaslighter or gas torch would not ignite in this environment This observation arises a question: "Why these two environments with absolutely the same partial pressure of oxygen provide such different effects on fire, its ignition and combustion process?" It might look strange because there is exactly the same amount of oxygen molecules present in both environments per specific volume (e.g. liter or cubic foot).

The answer is: "Because of a different oxygen concentration and its different availability for combustion due to kinetic properties and abilities of the gas molecules in both environments".

Figure 1:
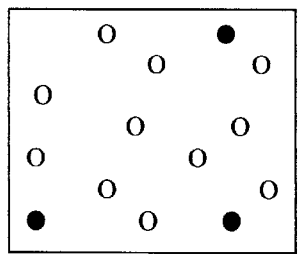
FIG. 1 presents a schematic view of oxygen and nitrogen molecules density in a hypobaric or natural altitude environment.

FIG. 1 presents a schematic view of oxygen and nitrogen molecules density in a hypobaric or natural environment at 9,000' or 2.7 km altitude. All other gases are disregarded in order to simplify following explanations. Dark circles represent oxygen molecules and hollow circles represent nitrogen molecules.

Figure 2:
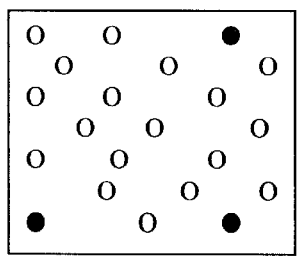
FIG. 2 presents a schematic view of oxygen and nitrogen molecules density in a normbaric hypoxic environment with the same partial pressure of oxygen.

FIG. 2 shows molecules density in hypoxic environment with the same partial pressure of oxygen (4.51" or 114.5 mm of mercury), but at standard atmospheric pressure of 760 mm of mercury.

As we can see there is the same amount of oxygen molecules in a specific volume in both environments. However, in the second case shown on FIG. 2 we notice an increased amount of nitrogen molecules with the rate of approximately 6:1 instead of 4:1 in the first case.

A comparison of the kinetic properties of both gases shows that nitrogen molecules are 2.5 times less permeable and slower than oxygen molecules. The increased amount of inert nitrogen molecules between oxygen molecules obstructs their kinetic behavior and reduces the availability of oxygen for a combustion process and even for ignition starting with a hypoxic environment with 15.5% oxygen concentration (equivalent of 8,000 ft or 2.4 km).

A normbaric hypoxic environment with 15% O2, which corresponds (in terms of partial pressure of oxygen) to an altitude of 9000' or 2700 m, would provide a safe fire-retarding environment for people to work in. It is scientifically proven that mild normbaric hypoxia provides the same effect on human body as corresponding natural altitude environment with the same partial pressure of oxygen. There are millions of people going to mountains for hiking, skiing and just vacations. They spend 24 hours a day at similar altitudes of 2.5 to 3 km and it's considered to be absolutely safe and healthy. It means that working in such altitude environment, even simulated) would be absolutely safe. There are also multiple health benefits of exposure to normbaric hypoxia that are described in many medical publications and on Hypoxico Inc's website www.hypoxico.com.

Figure 3:
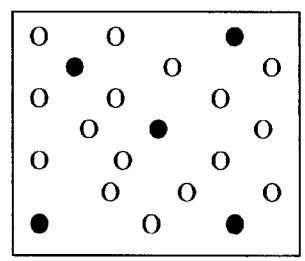
FIG. 3 presents a schematic view of oxygen and nitrogen molecules density in a normbaric normoxic environment or ambient air at sea level.

FIG. 3 shows oxygen/nitrogen composition in the ambient air at sea level that has greater partial pressure (159.16 mm of mercury) of oxygen than air at 9,000' (114.5 mm). However, it should be noticed that air in the atmosphere of Earth has the same oxygen concentration of 20.94% everywhere, from sea level to mount Everest or even higher up to 80 km or 260 000'. However, the air at sea level is more pressurized, which reduces distances between gas molecules and increases number of molecules per specific volume.

Further studies of this fire-suppression phenomenon of normbaric hypoxic environments provided the fact that a sufficient humidity may improve this effect much further. Faster moving water molecules provide additional buffer zone for oxygen molecules in humid air making them less available for ignition or combustion.

Figure 4:
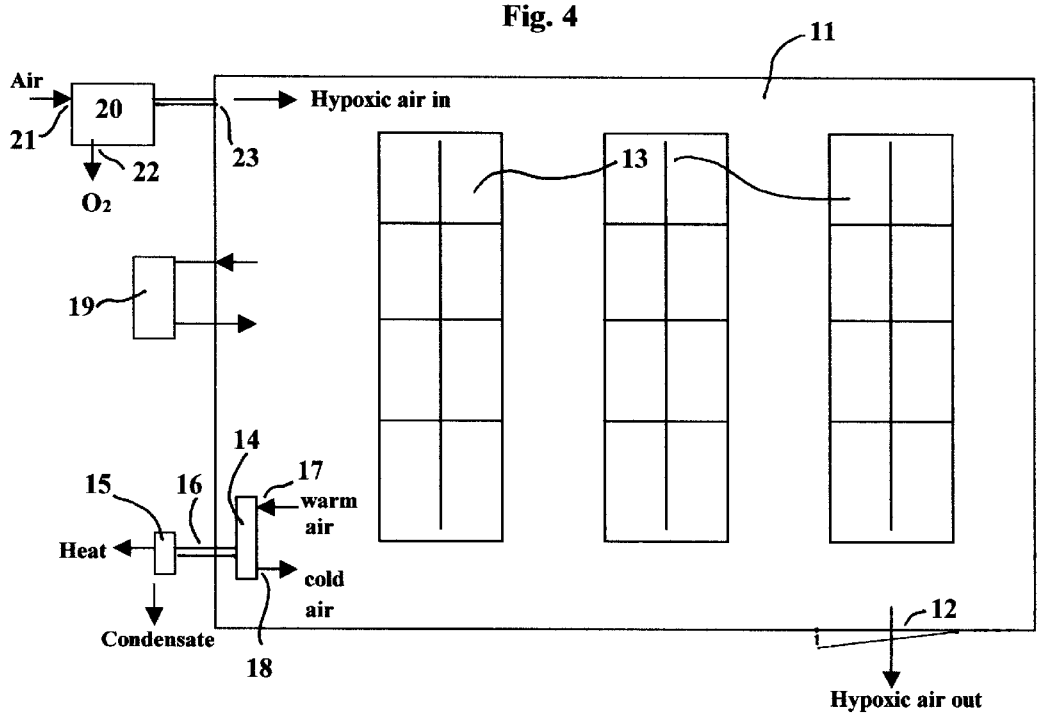
FIG. 4 illustrates schematically a working principle of normbaric hypoxic fire prevention and suppression system.

FIG. 4 shows a schematic view of a fire protected normbaric (or slightly hyperbaric) hypoxic room or enclosure 11 for computer equipment or storage of inflammable materials.

Racks 13 with computer equipment or inflammable material located in room 11, are exposed to a normbaric hypoxic environment with oxygen concentration about 15% (that corresponds to an altitude of 9,000' or 2,700 m) but at standard atmospheric pressure. Such normbaric hypoxic environment provides absolute fire safety by preventing combustible materials from inflammation and instantly suppressing electrical or chemically ignited fires.

Hypoxic environments having 16% to 18% oxygen content can also provide limited protection from fire hazards. It is advisable to provide normbaric hypoxic environments with oxygen concentration from 15% to 17% for public areas (e.g. museums and archives) and 14% to 15% oxygen content for human occupied facilities that require superior fire protection. Facilities that require only short periodical human visits may employ environments with oxygen content ranging from 14% to 12% corresponding to altitudes from 3 km or 10,000' to 4.5 km or 14,500'.

The hypoxic air inside computer room 11 is constantly maintained cool about 67° F. or 18° C. by a split air-conditioning unit 14 having external heat exchanger part 15 connected to unit 14 with a hose 16. Warm air enters unit 14 through intake 17, gets chilled and exits unit 14 through outlet 18. Hot refrigerant and water condensate from air are transmitted through the connector hose 16 into external unit 15, where refrigerant gets chilled and condensate evaporated or removed. The working principle of a split a/c unit is well known and shall not be described in this work. A suitable device—PAC/GSR is made by DeLonghi in Italy. Larger split a/c systems are also available worldwide. Other than computer room facilities may not require air conditioning at all.

Hypoxic generator 20 is installed outside room 11 in a neighboring room or any room in the building. Generator 20 intakes ambient air through the intake 21 and extracts part of oxygen from it, which is disposed in form of oxygen-enriched air through disposal outlet 22. Remaining hypoxic gas mixture is transmitted inside room 11 through supply outlet 23. Excessive hypoxic air leaves room 11 through door 12 in the same quantities as supplied, in order to equalize atmospheric pressure inside room 11 with the outside environment.

The door 12 for personnel entry is not airtight—it allows excessive air to exit the room 11. Usually a little gap of about 5 mm under the door would be enough for immediate pressure equalization and release of hypoxic air constantly supplied by generator 20 inside room 11. For some applications it would be beneficial to create a slightly hyperbaric environment. This is easy to achieve by making room 11 airtight and eliminating gaps around the door 12. Other possibilities are described in the previous U.S. Pat. Nos. 5,799,652 and 5,887,439.

A number of hypoxic generators needed for room 11 depends on the size of a room and a number of operators working at a time in the room. The best generator suitable for 1000 ft$^3$ or 28 m$^3$ room would be HYP-100/F that will be available soon from Hypoxico Inc. in New York. HYP-100/F employs PSA (pressure-swing adsorption) technology in order to extract part of oxygen from ambient air. This compact unit weighting only 55 lbs or 25 kg requires only 450W and is maintenance free. A nitrogen generator with the same productivity would be 3 times heavier and would require 2–3 times power consumption. Other advantages of the hypoxic generator include increased humidity of hypoxic air (no humidifier needed) and absolute safety—nothing can be done by a user in order to change oxygen concentration in the hypoxic product.

Figure 5:
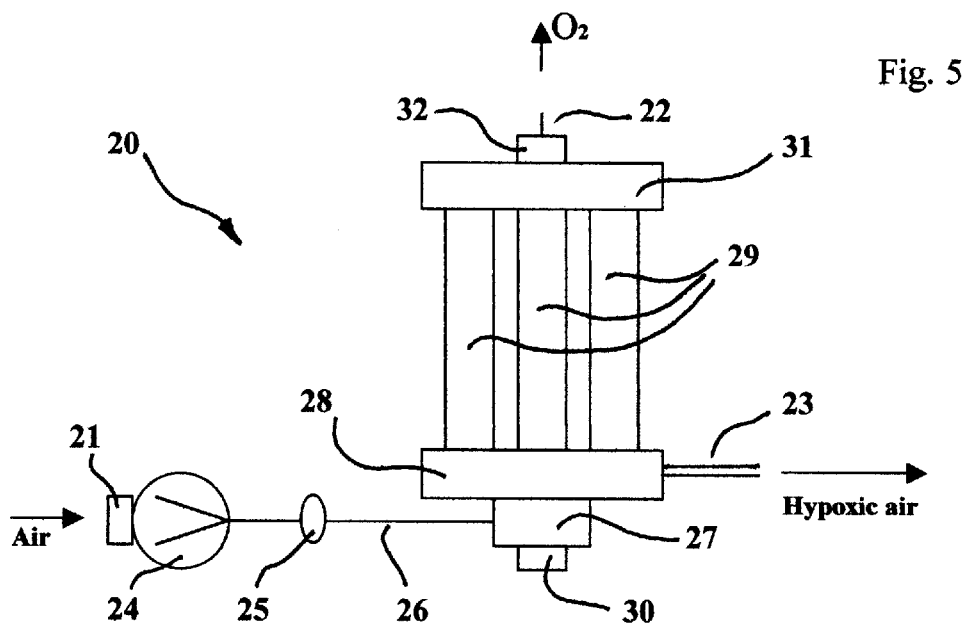
FIG. 5 presents a schematic view of a working principle of hypoxic generator HYP-100/F.

FIG. 5 illustrates the working principle of hypoxic generator 20. Compressor 24 intakes ambient air through intake filter 21 and pressurize it up to 18 psi. Compressed air is chilled in cooler 25 and is transmitted through conduit 26 into distribution valve 27 that is connected via manifold 28 with multiple separation containers or molecular sieve beds 29 being installed in a linear or circular formation, depending on design. Number of molecular sieve beds may vary from one to 12 or more. HYP-100/F is designed with 12 molecular sieve beds installed in circular formation and pressurized by rotary distribution valve 27 in 3 cycles, four beds at a time. In this particular case a small electric actuator motor 30 drives rotary valve 27. Design and working principle of rotary distribution valves, motors and actuators is well known to those skilled in the art and will not be described further. All these parts are widely available from valve manufacturers and distributors.

Each molecular sieve bed 29 (or group of beds in case of HYP-100/F) gets pressurized in cycles via valve 27 that selectively redirects compressed air flow into each bed systematically. Each bed 29 is filled with molecular sieve material, preferably zeolites, that allows oxygen to pass through but adsorbs most of other gases, including water vapors (which is important for the end product). Oxygen or oxygen-enriched fraction passing through zeolites is collected in collector 31 and is released further through release valve 32 and disposal outlet 22 into atmosphere.

When zeolites in one of the beds 29 become saturated with oxygen depleted air, compressed air supply is blocked by valve 27 and this bed depressurizes allowing oxygen depleted air to escape from zeolites and from the bed 29, being further transmitted through manifold 28 into hypoxic air supply conduit 23. The one-way release valve 32 allows keeping oxygen-enriched fraction in collector 31 under minimal pressure (about 5 psi), which assures that during depressurization of a bed 29 some oxygen will get back into bed 29 purging through zeolites contaminated with nitrogen and water, enhancing their adsorption capacity of zeolites.

Rotary motorized actuator 30 may be replaced with a linear actuator with mechanical air distribution valve 27. Actuator with motor 30 may be replaced by a set of solenoid valves or electrically operated air valves 27, however this will require addition of a circuit board, which makes generator 20 more costly and less reliable. Solenoid valves, mechanical or electrically operated air valves and linear actuators are widely available from many manufacturers and will not be described further.

Figure 6:
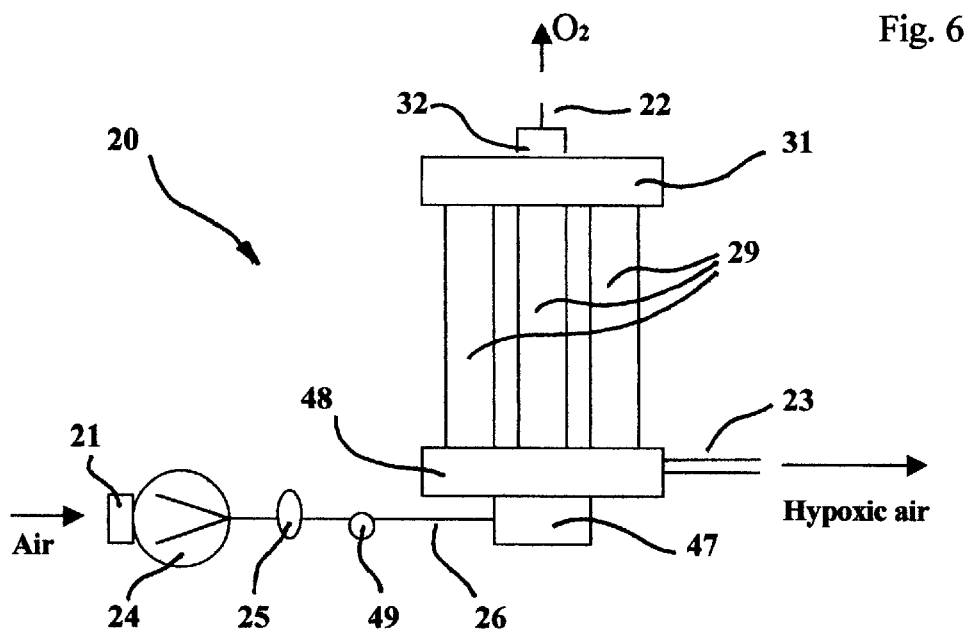
FIG. 6 provides future modification of the same generator shown on FIG. 5.

FIG. 6 shows a future hypoxic generator 40 that will be available from Hypoxico Inc. by the end of the year 2000. This model works only on compressed air provided by compressor 24 and does not require any additional electric motors, switches or circuit boards. In this case distribution valve 47 is an air-piloted valve or combination of air-piloted valves mounted on manifold 48. Air-piloted valves are driven by compressed air and do not require additional support. Compressed air delivered by compressor 24 is cleaned by a long-life HEPA filter 49 available from Hypoxico Inc. Working principle of air-piloted valves is known to those skilled in the art and will not be described in this work. Suitable Air-piloted valves are available from Humphrey Products in Kalamazoo, Mich., U.S.A. Many other combinations of simple air valves can be employed in distribution valve 47 in order to distribute compressed air in cyclic manner. A suitable distribution valve can be selected from the group consisting of electrical, mechanical, air piloted and solenoid valves, both linear and rotary configuration, with actuators controlled by pressure, mechanical spring, motor or timer. It is not possible to cover all potential air distribution solutions in this work. Number of molecular sieve beds in this model may vary from 1 to 12 or more.

HYP-100/F constantly provides 100 liters per minute of hypoxic air with 15% of oxygen (different settings from 12% to 18% are available and must be preset at the factory). HYP-100/F is absolutely safe and foolproof because it is impossible to change oxygen content in the product gas mixture. Larger size generators up to 1200 L/min will be available from Hypoxico Inc. in New York.

Hypoxic generator 20 in form of HYP-100/F supplies hypoxic air with about 15% greater humidity than ambient air intake. This and cool temperature provide perfect computer environment in mild climates. In dry climates or when a nitrogen generator in place of hypoxic generator 20 is used, it is advisable to install a humidifier 19 (optional in other cases) in order to humidify air in the room 11 up to about 40% of relative humidity or higher, if needed. Any common humidifier may be used that is certified for use for public areas.

Multiple generators 20 could be placed in a special generator room with own a/c system and fresh air supply above 500 ft$^3$/h or 14 m$^3$/hour per one HYP-100/F generator. This is very convenient for larger facilities with multiple rooms 11. In this case larger air-conditioning systems should be installed, working however, only in recycling mode. Hypoxic generators will provide sufficient ventilation of such environments and fresh air supply. Some human accessible environments may have oxygen content from 12% to 14%, if they do not require constant presence by human operators. Every hypoxic generator is equipped with a HEPA (high efficiency particulate arrestance) filters that allow supplying dust free hypoxic air in order to substantially reduce dust accumulations on computer equipment, which also beneficial for fire prevention.

Room 11 may also represent a computer cabinet with computer components 13 inside. It this case, hypoxic air supplied by a miniature size generator 20 is chilled by a small heat exchanger module 14 (both will be available from Hypoxico Inc.).

Any oxygen extraction device, such as nitrogen generator or oxygen concentrator can be used instead of hypoxic generator 20 as well, but it would provide some disadvantages. Nitrogen generators both types, PSA (pressure-swing adsorption) and membrane separation, require much higher pressures, which result in higher weight, power consumption and noise level, and costly maintenance. Moreover, nitrogen generator provides absolutely dry product and would require extensive humidification. Other new oxygen extraction technologies, such as temperature-swing or electrical current swing adsorption, may be also employed in the oxygen extraction device 20, most of them consisting of a pump means and an air separation module. The design and working principle of such air separation modules (employing both molecular-sieve adsorption and membrane separation technologies) is well known to those skilled in the art and is widely available in literature and on Internet.

Figure 7:
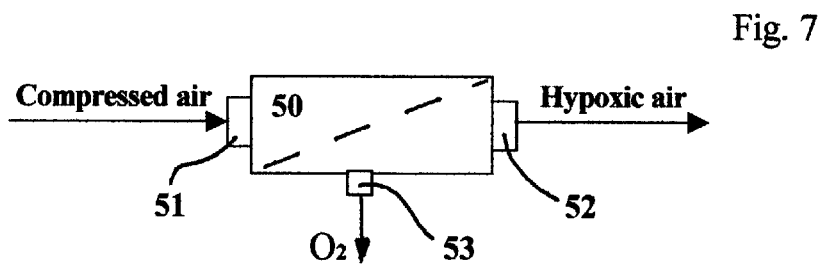
FIG. 7 illustrates a working principle of a membrane separation module.

FIG. 7 shows a schematic view of nitrogen generator or oxygen concentrator employing oxygen-enrichment membrane module 50 for extraction of oxygen that is disposed through outlet 53. Dry compressed air is delivered via inlet 51 into hollow-fiber membrane module 50. Faster oxygen molecules diffuse under pressure through the walls of hollow fibers and exit through outlet 53. Dry nitrogen or nitrogen enriched gas mixture passes through hollow fibers and is further transmitted through outlet 51 into room 11. The employment of this technology in the Hypoxic Fire-PASS concept would require additional humidification of the hypoxic environment in room 11.

Both, nitrogen generators and oxygen concentrators, would require reliable computerized controlling and monitoring equipment for maintaining exact oxygen level in the gas mixture, which makes it unsafe for human occupied facilities. For the same reason it is unsafe to use an oxygen concentrator that would extract oxygen from the hypoxic environment of room 11.

The principle of normbaric hypoxic environment for fire prevention and suppression could be applied to any room or enclosure of any size and shape, or whole building, marine vessels and cargo containers, aircraft, space vehicle or station, computer enclosure, dwellings, and most industrial and non-industrial facilities.

In large computer facilities each rack with computer equipment 13 may be enclosed in its own hypoxic room 11. This will save a lot of energy and will provide normoxic environment between racks 13. It will also not interfere with a facility fire suppression system. Moreover, it this case the facility may use much cheaper sprinkler systems because water will not be able to damage computer equipment enclosed inside each hypoxic room made from watertight panel enclosures. Hypoxico Inc. in New York manufactures suitable modular panel enclosures of any size. Air-conditioning for each such enclosure becomes optional in this case because the whole facility might be chill enough and incoming hypoxic air could be chilled previously in generator room.

Invented Hypoxic FirePASS can be used in any human occupied facility included but not limited to: rooms for data processing, telecommunication switches, process control and Internet servers; banks and financial institutions, museums, archives, libraries and art collections; military and marine facilities; aircraft, space vehicles and space stations, marine and cargo vessels; industrial processing and storage facilities operating with inflammable and explosive materials and compositions, and many other different application that require prevention of fire hazard.

Fire prevention systems employing invented Hypoxic FirePASS technology will guarantee that no fire will start in such areas under any circumstances. More information can be obtained soon from www.firepass.com.

What is claimed is:

1. A system for providing a breathable fire-extinguishing environment for fire prevention and fire suppression in enclosed areas, said system comprising:

an enclosing structure having internal environment therein containing a gas mixture which is lower in oxygen content than air outside said structure, and an entry communicating with said internal environment;

an oxygen-extraction device having an inlet taking in an intake gas mixture and first and second outlets, said first outlet transmitting a first gas mixture having a higher oxygen content than the intake gas mixture and said second outlet transmitting a second gas mixture having a lower oxygen content than the intake gas mixture;

said second outlet communicating with said internal environment and transmitting said second mixture to said internal environment so that said second mixture mixes with the air in the internal environment;

said first outlet transmitting said first mixture to at location where it does not mix with the air in the internal environment;

said internal environment selectively communicating with the outside atmosphere and emitting excessive internal gas mixture into outside atmosphere;

said internal environment beg a breathable hypoxic air composition in human visited or occupied areas having oxygen content ranging front 12% to 18%.

2. The system according to claim 1 and said intake gas mixture is ambient air intaken outside said internal environment.

3. The system according to claim 1 and said oxygen-extraction device employing molecular-sieve adsorption technology in order to extract part of oxygen from said intake gas mixture.

4. The system according to claim 1 and said oxygen-extraction device employing membrane separation technology in order to extract part of oxygen from said intake gas mixture.

5. The system according, to claim 1 and said enclosing structure being area selected from the group consisting of, but not limited to:

rooms and enclosures for data processing and process control equipment, telecommunication switches and Internet servers; banks and financial institutions, museums, archives, libraries and art collections; dwellings, military and marine facilities; aircraft, space vehicles and space stations, marine and cargo vessels; industrial processing and storage facilities operating with inflammable arid explosive materials and compositions, and other industrial and non-industrial facilities that require fire safe environment.

6. The system according to claim 1 and said internal environment having climate control.

7. The system according to claim 1 and said composition being oxygen depleted air with oxygen content ranging from 15% to 17%.

8. A fire prevention and suppression system for providing low-oxygen atmosphere for industrial and non-industrial applications comprising:

an enclosed area comprising a door and wall structure defining a closed space which is accessible through the door, said door being selectively closeable so that when closed, the area is substantially isolated from the outside environment;

a gas processing device having an intake and first and second outlets, said device taking in ambient air through said intake and emitting a reduced oxygen gas mixture, having a lower concentration of oxygen than ambient air, through said first outlet and enriched-oxygen gas mixture, having a greater concentration of oxygen than ambient air, through said second outlet;

said first outlet being connected with said area so that reduced oxygen gas mixture is emitted into said closed space inside said area;

said gas processing device comprising an air pump and an air separation module receiving ambient air from the intake, said air separation module having a reduced oxygen mixture conduit and an enriched oxygen mixture conduit;

said first outlet being operatively associated With said reduced oxygen mixture conduit and receiving said reduced oxygen gas mixture therefrom, said second outlet being operatively associated with said enriched oxygen mixture conduit and receiving said enriched oxygen gas mixture therefrom and releasing said mixture into the outside environment;

said reduced oxygen gas emitting from said area in amounts necessary to equalize atmospheric pressure inside said area with outside atmospheric pressure;

said reduced oxygen gas mixture inside said area having oxygen content ranging from 12% to 18%;

said gas mixture having fire retarding capacity and being safe for human respiration.

9. The system according to claim 8 an said reduced oxygen gas mixture inside said area being recycled by a split air-conditioning system in order to control its temperature and humidity;

said gas mixture having fire retarding capacity and being safe for human respiration.

10. The system according to claim 8 and said air separation module being hypoxic generator employing molecular-sieve adsorption material and pressure-swing adsorption technology, in order to extract part of oxygen from ambient air and supply oxygen depleted product.

11. The system according to claim 8 and said air separation module being oxygen concentrator using pressure-swing adsorption technology.

12. The system according to claim 8 and said air separation module being oxygen concentrator using membrane air-separation technology.

13. The system according to claim 8 and said air separation module being nitrogen generator using pressure-swing adsorption technology.

14. The system according to claim 8 and said air separation module being nitrogen generator using membrane air-separation technology.

15. A system for providing a breathable fire-extinguishing atmosphere for human occupied environments, said system comprising:

an enclosed space having said breathable fire-extinguishing atmosphere inside that is provided by an apparatus consisting of;

a compressor and an air separation device laving an intake and first and second outlets, said device taking in compressed air provided by said compressor through said intake and emitting a reduced-oxygen gas mixture having a lower concentration of oxygen than said gas mixture through said first outlet and enriched-oxygen gas mixture having a greater concentration of oxygen than said gas mixture through said second outlet;

said intake being connected to a distribution valve providing distribution of compressed air to multiple inlets communicating each with an individual separation container filled with a molecular sieve material that under pressure adsorbs nitrogen and water vapors, allowing enriched-oxygen gas mixture to pass through into a gas collecting tank communicating with said second outlet and being operatively associated with all said separation containers and receiving said enriched-oxygen gas mixture therefrom;

each said separation container being pressurized and depressurized in cycling manner and releasing during each depressurization cycle said reduced-oxygen gas mixture being delivered into said first outlet;

said breathable fire-extinguishing atmosphere being a mixture of nitrogen, oxygen and other atmospheric gases at atmospheric pressure being ambient for location of use;

said mixture having oxygen content above 12% but below 18%;

said mixture having nitrogen content above 82% but not exceeding 87.6%.

16. The system according to claim 15 and said second outlet having release valve allowing to keep said enriched-oxygen gas mixture being collected in said gas collecting tank under increased atmospheric pressure, so when any of said separation containers depressurizes, a portion of said enriched-oxygen gas mixture is released from said tank back into said container purging said molecular sieve material from remaining nitrogen and water.

17. The system according to claim 15 and said distribution valve being air distribution device, selected from the group consisting of electrical, mechanical, air piloted and solenoid valves, both linear and rotary configuration, with actuators controlled by pressure, mechanical spring, motor and timer.

18. The system according to claim 15 and said distribution valve being mounted on manifold that is selectively communicating with said multiple separation containers and said first outlet, and selectively allowing periodic access of pressurized air inside said containers and exit of said reduced-oxygen gas mixture therefrom.

* * * * *

UNITED STATES PATENT AND TRADEMARK OFFICE
CERTIFICATE OF CORRECTION

| | | |
|---|---|---|
| PATENT NO. | : 6,314,754 B1 | Page 1 of 1 |
| APPLICATION NO. | : 09/551026 | |
| DATED | : November 13, 2001 | |
| INVENTOR(S) | : Igor K. Kotliar | |

It is certified that error appears in the above-identified patent and that said Letters Patent is hereby corrected as shown below:

In the last clause of Col. 8 line 32, claim 1, between the words "environment" and "a breathable" delete the word "beg" and insert therefor the word --being-- and In the last clause of Col. 8 line 34, claim 1, between the words "ranging" and "12% to 18%" delete the word "front" insert therefor the word --from--.

Signed and Sealed this

Twelfth Day of August, 2008

JON W. DUDAS
*Director of the United States Patent and Trademark Office*